United States Patent Office 3,544,300
Patented Dec. 1, 1970

3,544,300
METHOD OF INCREASING AVAILABLE PHOSPHATE CONTENT OF PHOSPHATE ORE
Calvin Seiso Kobayashi, Nyack, N.Y., assignor to Stauffer Chemical Company, New York, N.Y., a corporation of Delaware
No Drawing. Filed May 8, 1967, Ser. No. 636,679
Int. Cl. C05b 11/14
U.S. Cl. 71—38                                                7 Claims

ABSTRACT OF THE DISCLOSURE

The available phosphate content of phosphate ores can be increased by reacting substantially anhydrous phosphate ores with sulfur trioxide in a substantially anhydrous environment at temperatures as low as ambient. A dry free-flowing material having sufficient available phosphate for use as a fertilizer is provided.

---

The present invention relates to a method of increasing the available phosphate of phosphate ores by reacting substantially anhydrous ore with sulfur trioxide. The invention also relates to the product produced by the method which is a dry free-flowing material having sufficient available phosphate for use as a fertilizer.

Naturally occurring phosphate ores are generally unfit for use as fertilizer materials in that the phosphate values are usually in the form of water-insoluble tricalcium phosphate salts. In order to make use of these phosphate ores as fertilizers, the insoluble tricalcium phosphate salts must be converted by chemical means to the more soluble mono- or dicalcium phosphate salt forms. In fertilizer compositions, the amount of phosphate in the mono- or dicalcium salt form is generally regarded as the amount of available phosphates in the composition.

The amount of available phosphates present in any fertilizer mixture is commonly determined by their solubility in neutral ammonium citrate solution, according to the official method of the Association of Official Analytical Chemists. This result is usually expressed as percentage of available $P_2O_5$. The monocalcium phosphates are generally soluble in water and the dicalcium phosphates are soluble in the neutral ammonium citrate, the total of the water-soluble and citrate-soluble phosphates being the total percentage of available phosphates for use as fertilizer materials. Effective fertilizers prepared from phosphate ores should contain at least 15% available phosphates.

In the past, numerous processes have been utilized for upgrading or increasing the available phosphate content in phosphate ores for the production of phosphate fertilizer materials. One of the main processes is the wet process wherein phosphate ore is treated with sulfuric acid to convert the tricalcium phosphate salts into the mono- and dicalcium forms so as to increase the amount of available phosphate in the ore. The wet process is carried out by mixing ground rock with sulfuric acid, holding the acid-rock mixture in a den or a container to allow the reaction to proceed and finally transferring the product to a curing chamber to allow completion of the chemical reaction. This process usually takes numerous weeks from the time the phosphate ore enters the manufacturing scheme until the time it is finally cured, the curing step itself requiring from two to four weeks. An increase in the water content of the sulfuric acid, plus the addition of a drying step to the manufacturing procedure, can be utilized to decrease the overall length of time necessary to complete the reaction for the production of fertilizer materials.

An in situ sulfuric acid type reaction is set forth in U.S. pat. to Mayer, 1,246,636, issued Nov. 13, 1917, wherein an aqueous sludge of phosphate ore is treated with a mixture of sulfur dioxide and sulfur trioxide gases in the presence of air or oxygen, the gaseous mixture being indicated to preferably contain a substantial amount of sulfur trioxide. The reaction proceeds by the combination of sulfur trioxide with water to form sulfuric acid which acid then reacts with the phosphate ore in a reaction sequence corresponding to that accomplished with the wet processing of the phosphate ore. The main advantages of this known process are stated to be the elimination of the sulfuric acid forming step and the controlling of the temperature of reaction by the incremental addition of the sulfur trioxide to the aqueous sludge so as to prevent evolution of hydrofluoric acid and other fluorine containing compounds. However, the fertilizer product must be denned, cured and dried as in the wet process necessitating again extensive times for the preparation of a final product.

It has now been found that the available phosphate content of phosphate ores can be increased by a method which substantially eliminates the extensive curing and drying operations as are presently required for the production of increased available phosphate materials from phosphate ores. This method allows for the rapid preparation of materials having sufficient available phosphates for use as fertilizers with the corresponding saving of the amount of labor and plant time necessary to produce a final product.

In accordance with the present invention, the available phosphate content of phosphate ore can be effectively increased by reacting substantially anhydrous phosphate ores with sulfur trioxide at temperatures as low as ambient temperature. The product of the reaction is a dry, non-hydroscopic, free-flowing product which has sufficient available phosphate for use as an efficient fertilizer material.

As used in this specification, the terms susbtantially anhydrous, and, in the substantial absence of water, are intended to mean a water content of less than 0.2% by weight based on the total weight of the phosphate ore. Unless otherwise stated, the use of the term anhydrous is to mean phosphate ores having a water content of less than 0.2%.

The reaction between the phosphate ore and the sulfur trioxide is conducted in the absence of water. The absence of water in the system precludes the reaction of sulfur trioxide with water to form sulfuric acid which could then react with the phosphate ore to form the soluble phosphate salts as in the prior art systems. It is theorized that the sulfur trioxide reacts with the anhydrous ore to form a sulfato-phosphate reaction product which is hydrolizable to form the phosphate salts necessary for the fertilization of the soil. Applicant sets forth this theory as an attempt to illuminate the reaction sequence. However, it is to be understood that this is a theory and applicant does not intend to be bound thereby.

The phosphate ores which can be used are any of those naturally occurring phosphate ores, such as the pebble phosphates found in Florida or the brow phosphate ores found in Tennessee. As a specific example, Florida fluorapatite ore has been found to be particularly useful in the process of the present invention.

The phosphate ore is required to be in a substantially anhydrous condition. While small quantities of water up to 0.2% by weight based on the total weight of the ore can be tolerated, it is preferred that the ore be completely anhydrous. This is generally accomplished by calcining the mined ore in a furnace or other calcining medium. Roasting of the ore for approximately three hours in a furnace at a temperature of around 1800° F. is sufficient to remove the water contained in the ore. The temperature and duration of calcining operation necessary to effect the removal of the water present in the ore is dependent on the nature of the ore utilized and its water content, and optimum conditions for the calcining operation can be easily determined by experiment for each type of ore utilized. Other means of removing the water content from the ore, such as by the use of chemical means to extract the water content can be used if desired.

Following the calcining operation, the ore is cooled, ground and graded into sizes. Ores of less than approximately 40 mesh are generally required for the production of a useable fertilizer. It is preferred to utilize ores having a particle size of from about 100 to about 300 mesh in that the smaller size particle provides more complete intimate contact of the ore with sulfur trioxide so as to facilitate the interaction between the two materials. To provide a uniform fertilizer product, it is preferred to utilize ores having a particle size within the range of about 100 to about 200 mesh.

The graded ore is then reacted with sulfur trioxide in a substantially anhydrous environment. The sulfur trioxide can be used in the form of a liquid or a gas and can be purchased commercially or prepared on site as desired. Preferably, an excess of that amount required for reaction is used. The use of liquid sulfur trioxide provides greater contact area with the phosphate ore. The reaction can be conducted as a batch process or as a continuous manufacturing process as desired. For liquid-solid phase batch processes, sealed or closed vacuum reaction kettles having stirring paddles are conveniently used. The use of sulfur trioxide in vapor form is advantageous in that overall processing of the ore is simplified. Gaseous sulfur trioxide can be effectively utilized in a fluidized bed reaction column. These are set forth as illustrative of the various types of processing equipment which can be utilized by one skilled in the art to perform the process of the present invention.

The reaction is conducted at temperatures necessary to maintain the sulfur trioxide in its appropriate physical form. In using the liquid form, temperatures between the range of 18° to 45° C. are appropriate and in utilizing the vapor phase, temperatures above 45° C. can be used. Subatmospheric or superatmospheric pressure can be used to vary the point of transition between the liquid phase and the vapor phase of the sulfur trioxide if desired. Also, vaporized $SO_3$ can be formed by bubbling an inert carrier gas such as air or nitrogen through the liquid sulfur trioxide and this can be accomplished at low temperatures. The use of liquid sulfur trioxide and the $SO_3$ carrier gas mixture provide the basis of reaction systems which requires the addition of almost no heat to the reaction. Gaseous sulfur trioxide can be formed using a relatively small heat input. As is obvious, the low heat input requirements of a chemical process are economically advantageous.

While the reaction proceeds rapidly upon initial contact of the reactants, it is preferred that the reactants remain in contact for a period of time sufficient to insure the substantial completeness of the reaction. This is done in order to obtain the greatest possible amount of available phosphorus from the phosphate ore. The use of a contact time of about 24 hours has been found to be effective.

Following the reaction, residual sulfur trioxide is removed from the treated phosphate ore, which removal can be effected in any convenient manner. The sulfur trioxide can be removed by subjecting the reaction mass to slight heating under vacuum conditions. The use of vacuum can be easily accomplished within the reaction vessel, especially with regard to the liquid-solid phase reaction, by attaching a vacuum source thereto and evacuating the vessel following the reaction. Also, the residual sulfur trioxide can be removed by feeding the reaction mass into a rotating drum into which is directed a warm air mass at temperatures of approximately 70 to 90° C. These are given as illustrative and any method which can accomplish the removal of the residual sulfur trioxide from the treated phosphate ore can be utilized.

The product obtained from the reaction following the removal of residual sulfur trioxide is a free-flowing, nonhygroscopic, dry powder material which can be easily bagged or transported in bulk containers to the ultimate user. The product contains approximately 15% to 20% available phosphorus which is a sufficiently high available phosphate content to allow the use of the material as a fertilizer and is comparable with fertilizer materials presently prepared with the wet processes now in use.

The present invention is illustrated in the example which follows:

EXAMPLE

Florida fluorapatite ore [$Ca_{10}(PO_4)_6F_2$] of less than 50 mesh was heated for 3½ hours at 1800° F. to remove moisture. Five grams of anhydrous ore was then slowly added with stirring to 30 milliliters of sulfur trioxide under vacuum in a reaction vessel. The reaction mixture was stirred for approximately 48 hours and the temperature maintained at ambient temperature by means of a copper cooling coil. Excess sulfur trioxide was removed from the reaction vessel by slowly heating the reaction mixture to 80° C. while maintaining the reaction vessel under vacuum. To insure complete removal of adsorbed sulfur trioxide, the heating and the vacuum were continued for three hours. The product upon analysis showed a water soluble phosphate content of 7.47% of the total phosphorus and a citrate soluble fraction of 8.12%. A sample of the same ore as used in the example which was not treated showed no water soluble phosphate content and only 1.89% citrate soluble material. Analysis procedures were those as set forth in Official Methods of Analysis, 8th ed., Association of Official Agricultural Chemists, 1955, pages 11 and 12.

The aforegoing results can also be obtained by passing gaseous sulfur trioxide through a packed column of substantially anhydrous phosphate ore and passing the resulting reaction mass into a rotating drum into which is directed a warm air mass at temperatures of approximately 70 to 90° C.

Thus, and in accordance with the present invention, there is provided a method for easily increasing the available phosphate content of phosphate ores by treating substantially anhydrous phosphate ores with sulfur trioxide which method can be effected at low temperatures including ambient temperatures. The phosphate material obtained from the reaction is a dry, nonhygroscopic, free-flowing powder having sufficient available phosphate for use as a fertilizer material.

The invention is defined in the claims which follow. What is claimed is:

1. A method of increasing the available phosphate content of phosphate ore which comprises:
    (a) reacting an anhydrous phosphate material in a finely divided state with gaseous or liquid sulfur trioxide in a substantially anhydrous environment in an amount and for a time sufficient to provide a reaction product having an increased amount of available phosphate above the level of that provided by said phosphate ore, said anhydrous phosphate material being provided by calcining said phosphate ore to a water content of less than 0.2% by weight based on the weight of the phosphate material; and
    (b) removing any residual sulfur trioxide from said phosphate material upon the completion of said reaction.

2. The method as recited in claim 1 wherein said residual sulfur trioxide is removed from the phosphate-sulfur trioxide reaction product by applying a vacuum in combination with slight heating to said reaction product.

3. The method as recited in claim 1 wherein said sulfur trioxide is a liquid.

4. The method as recited in claim 1 wherein said sulfur trioxide is a vapor.

5. The method as recited in claim 4 wherein said vapor is a mixture of $SO_3$ and an inert carrier gas.

6. The method as recited in claim 1 wherein said phosphate ore is apatite.

7. The method as recited in claim 1 wherein said reaction is conducted at ambient temperature.

References Cited

UNITED STATES PATENTS

| 1,849,526 | 3/1932 | Hultman | 23—3 |
| 1,172,420 | 2/1916 | Bassett | 71—38 |
| 1,413,048 | 4/1922 | Matheson | 71—38 |

REUBEN FRIEDMAN, Primary Examiner

B. H. LEVENSON, Assistant Examiner